Feb. 4, 1930. I. J. REMARK 1,746,200
METHOD OF AND APPARATUS FOR VULCANIZING INNER TUBES FOR PNEUMATIC TIRES
Filed July 30, 1926 3 Sheets-Sheet 1
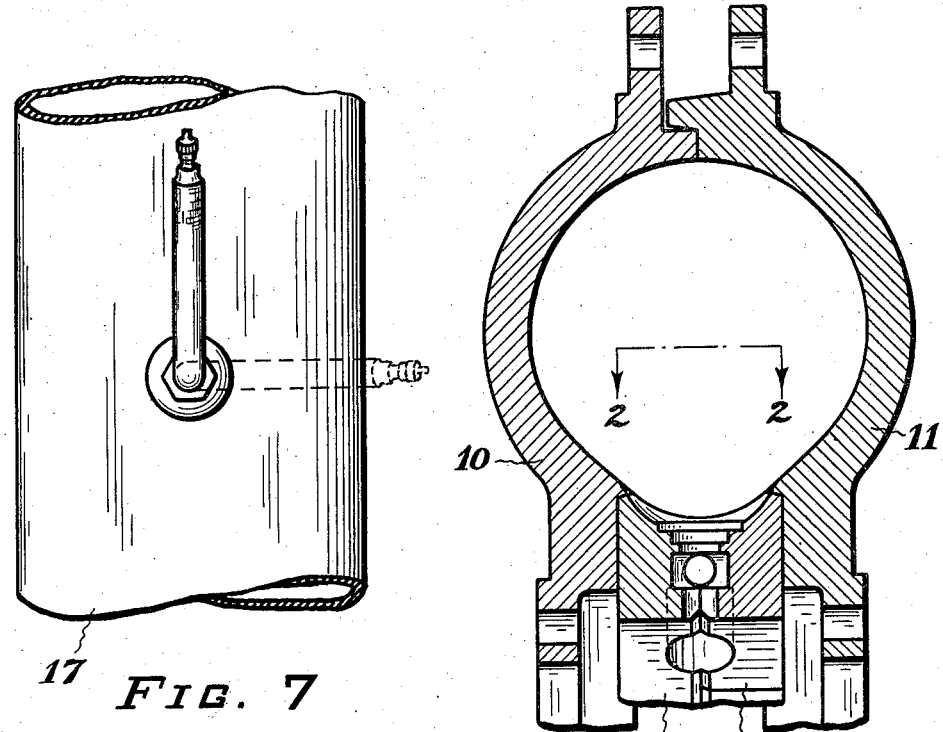
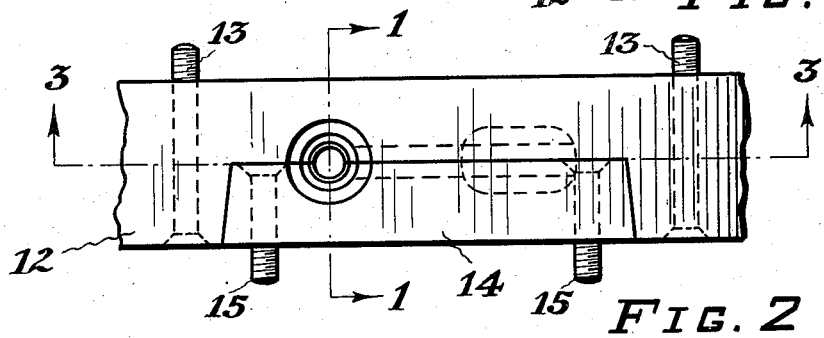
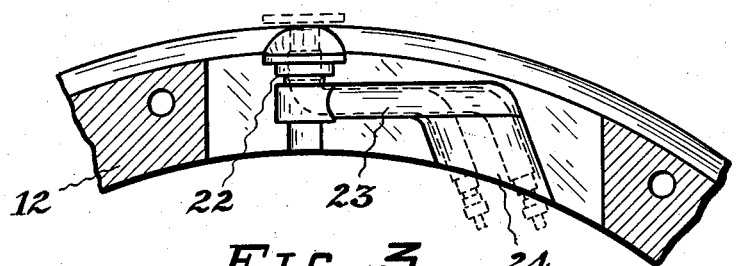
INVENTOR
Isidore J. Remark
BY Evans & McCoy
ATTORNEY Feb. 4, 1930.   I. J. REMARK   1,746,200
METHOD OF AND APPARATUS FOR VULCANIZING INNER TUBES FOR PNEUMATIC TIRES
Filed July 30, 1926   3 Sheets-Sheet 2
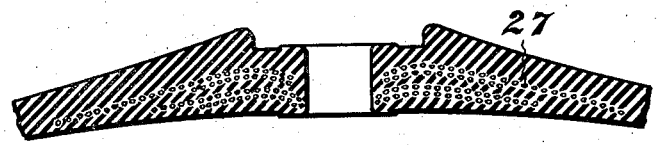
FIG. 12
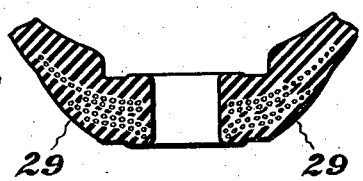
FIG. 13
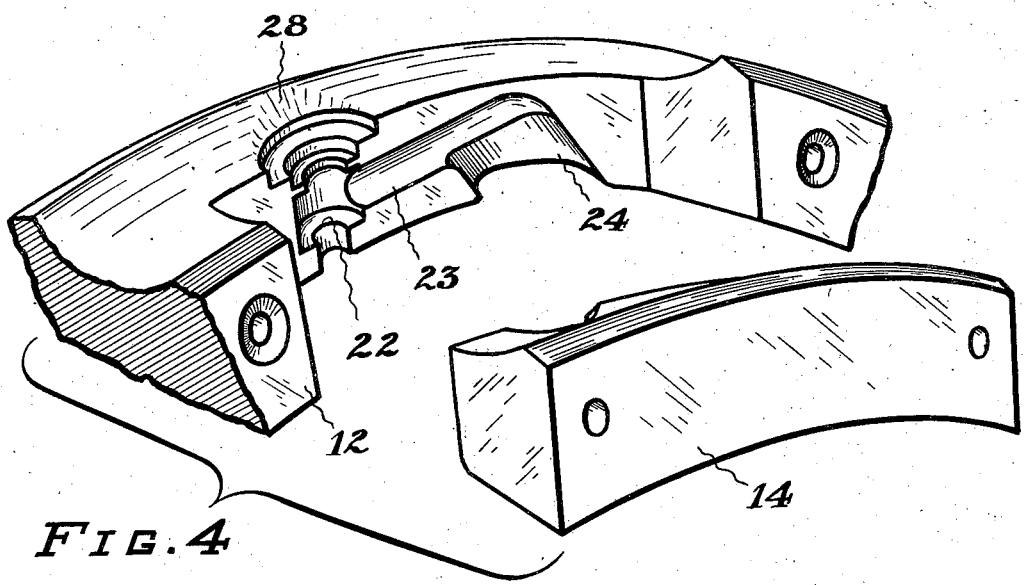
FIG. 4
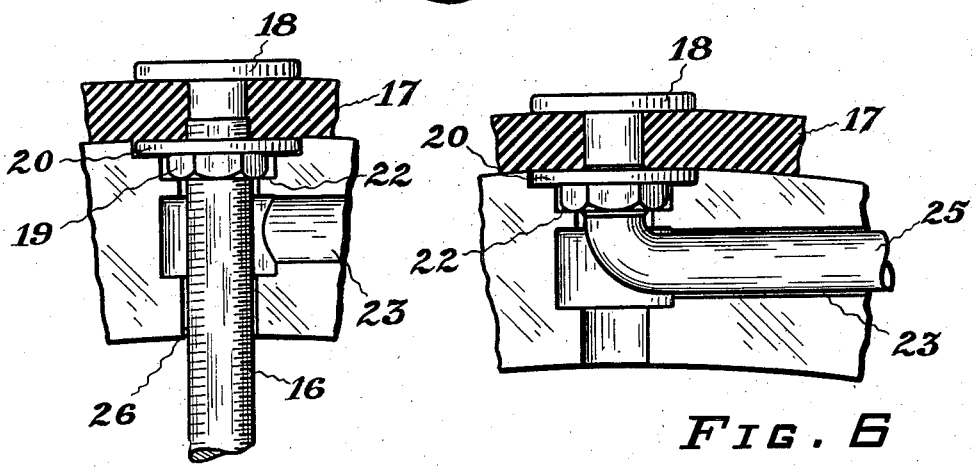
FIG. 5   FIG. 6
INVENTOR
Isidore J. Remark
BY Evans & McCoy
ATTORNEY INVENTOR
Isidore J. Remark
BY Evans & McCoy
ATTORNEY Patented Feb. 4, 1930

1,746,200

UNITED STATES PATENT OFFICE

ISIDORE J. REMARK, OF AKRON, OHIO, ASSIGNOR TO THE GENERAL TIRE & RUBBER COMPANY, OF AKRON, OHIO, A CORPORATION OF OHIO

METHOD OF AND APPARATUS FOR VULCANIZING INNER TUBES FOR PNEUMATIC TIRES

Application filed July 30, 1926. Serial No. 125,865.

This invention relates to the vulcanization of inner tubes for pneumatic vehicle tires, and it is particularly directed to an improved method of and apparatus for vulcanizing inner tubes with the valve stems mounted in place therein.

Although watch case heater molds have heretofore been used for the vulcanization of inner tubes with straight valve stems mounted therein, so far as applicant is aware, the difficulty of providing a suitable mold for accommodating angle valves has thus far precluded the commercial vulcanization of tubes with angle valves mounted in place therein. The usual practice has been to first vulcanize the tube with a straight valve mounted therein, to then remove the straight valve through an opening in the side wall of the tube, and insert the angle valve and close the opening in the side wall of the tube.

Watch case vulcanizers have also been proposed having the separation of the mold materially offset from the median plane of the mold cavity and also having means for arresting the movement of the valve stem after the valve head is embedded a material depth in the softened inner wall of the tube during vulcanization.

If a valve is left unsupported within a tube during vulcanization, the inflation pressure drives the valve head into the softened rubber of the tube wall, thereby greatly weakening the tube in a critical zone. In order to overcome this difficulty, the partial embedding of the valve head by permitting it to sink a short distance into the side wall of the tube and then arresting the movement of the valve stem, has been proposed.

In accordance with this invention, I propose a method of vulcanizing inner tubes with either angle or straight valve stems mounted in place therein, the valve stem being initially supported by the mold when the tube is first introduced into the heater in order to restrict the embedding of the valve head in the side wall of the tube to a minimum degree. I also propose apparatus for interchangeably vulcanizing inner tubes with either angle or straight valves mounted therein.

The heater herein proposed also differs from the previously proposed structures by having a separately formed annular mold ring that has a novel valve receiving portion formed therein that reduces the expense of machining the heater mold.

One object of the invention is to provide a more satisfactory method of vulcanizing inner tubes with the valve stems mounted in place therein.

Another object of this invention is to provide a method of vulcanizing inner tubes in watch case heater molds with angle valve stems mounted therein.

An additional object of the invention is to provide an improved form of watch case vulcanizing mold that is adapted to receive either straight or angle valves of different lengths without modification.

Another object of the invention is to provide a less expensive mold of more easily machined parts than molds heretofore proposed.

Additional objects and benefits to be derived from practicing the invention will be apparent from a consideration of this specification and the accompanying drawings, wherein:

Figure 1 is a transverse sectional view taken substantially on line 1—1 of Fig. 2, of a watch case heater mold shell constructed in accordance with this invention.

Fig. 2 is a plan view, looking in the direction of the arrows 2—2 of Fig. 1, of a separately formed mold ring comprising a part of the mold structure shown in Fig. 1.

Fig. 3 is a side sectional view taken on line 3—3 of the mold ring shown in Fig. 2.

Fig. 4 is an exploded view in perspective of the universal valve stem receiving portions of the mold ring.

Fig. 5 is a longitudinal sectional view, with parts broken away, of one part of the mold ring having a straight stem valve mounted therein.

Fig. 6 is a corresponding view of the same mold ring part with an angle valve mounted therein.

Fig. 7 is a view of the radially inner face of an inner tube showing the angle valve stem in full line as initially mounted in the tube during vulcanization, and also showing the position to which the valve stem is finally adjusted in dotted outline.

Fig. 12 is a longitudinal sectional view of an inner tube vulcanized in accordance with this invention and shown with the valve stem removed; and Fig. 13 is a lateral sectional view of the tube shown in Fig. 12.

Figure 8:
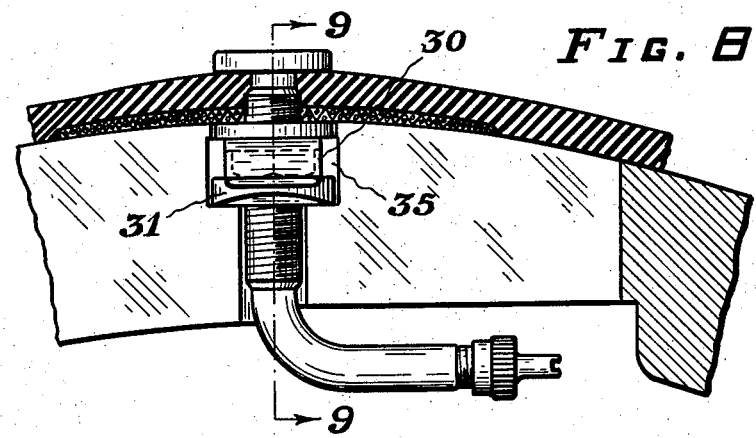
Fig. 8 is a side sectional view of a modified form of mold ring adapted to accommodate a modified form of angle valve.

The watch case mold unit shown in Figs. 1 to 6, inclusive, comprises a pair of opposed mold shells 10 and 11 that cooperate with a mold ring 12 to provide a molding cavity. The mold shell 10 is adapted to be carried by the stationary portion of the heater frame and the portion 11 by the swingable portion of the heater in the conventional manner. The separately formed mold ring 12 is rigidly connected to the shell 10 by suitable screws 13 that are arranged at desired intervals around the mold ring.

A portion of the mold ring 12 is cut away to receive a valve adaptor block 14 that is secured to the shell 11 that is carried by the heater lid by a pair of screws 15. The block 14 interfits with the mold ring 12 to complete the mold ring and to provide therebetween a novel form of valve receiving recess for interchangeably receiving either straight or angle valve stems of different lengths. The shape and character of this recess can best be explained in its relation to a conventional form of valve stem adapted to be received thereby.

A conventional form of straight valve stem 16, for use in an inner tube 17, is shown in Fig. 5. The valve base 18, that remains inside the inner tube, is supported by an annular ledge or shoulder 22 of the mold ring that engages the nut 19 that is carried by the valve stem. In order that the valve base will not embed itself within the side wall of the tube a sufficient degree to weaken the tube at this point, the valve base is supported from the shoulder 22 when the tube is initially mounted in the heater. A valve washer 20, of conventional form, is interposed between the nut 19 and the side wall of the tube.

The mold ring 12 and adaptor block 14 have suitable annular depressions formed therein for receiving and supporting the washer 20, so that its outer surface substantially forms a continuation of the mold surface. The nut 19 is supported on an annular shoulder 22, a portion of which is formed on both the mold ring and the adaptor block. The mold ring and adaptor block also fit the valve stem sufficiently close at the radially inner face of the mold ring to maintain the valve stem properly aligned during vulcanization.

The mold ring and adaptor block also have complemental grooves 23, formed therein for receiving an angle valve 25 that is mounted substantially in alignment with the median plane of the tube. So far as known to me, it has heretofore been regarded as necessary to vulcanize the valve in the tube in its final position. I propose vulcanizing the tube with the valve in the position shown, and then twisting the valve to the desired final position in the fully vulcanized tube before the nut 19 is drawn tightly down against the washer 20. The complemental grooves 23, that receive the shank of the angular valve stem have enlarged mouth portions 24 that are adapted to accommodate a suitable connector for inflating the tube during vulcanization and to accommodate angle valves of different lengths.

In using the heater mold herein proposed, the inner tube is first provided with either an angle or straight valve stem. If an angle valve stem is used, it is twisted on its seat to substantially the position shown in solid line in Fig. 7 and the nut 19 is tightened only a sufficient degree to keep the valve in the desired position during the subsequent handling of the tube. If a straight valve is used, the nut 19 is similarly tightened to hold the valve in position.

The tube is then mounted in the mold with the nut 19 carried by either the straight or angle valve substantially seated on the opposed shoulders 22. This prevents subsequent movement of the valve during vulcanization. The position occupied by the valve at this step in the vulcanization, is shown in Fig. 5 and Fig. 6. The grooves 23 and the support 26 assist in maintaining the valve stem in proper position.

The tube is inflated under vulcanizing pressure after the mold is closed and the tube is vulcanized with the valve in its supported position.

When vulcanizing pressure is first applied to the tube, there may be considerable leaking of air around the valve stem. It has been found, however, that the softened rubber of the tube soon seals the leaks around the valve stem and enables the inflating pressure of the tube to be economically maintained during the vulcanizing process without initially drawing the nut 19 down on the valve stem sufficiently tight to prevent leakage and also without causing the inflating pressure to act on the valve head to push the head into the side wall of the tube.

Since the rubber of the tube expands somewhat during vulcanization, the head of the valve stem becomes slightly embedded in the inner surfaces of the tube as indicated by the shape of the completely vulcanized tube shown in Fig. 12 and Fig. 13. It will be noted, however, that ample rubber cushion is maintained between the head of the valve stem and the fabric 27 of the valve patch thus greatly strengthening the tube at this point. It will also be noted that the complemental depressions 28 that are formed in the mold ring 12 on each side of the valve opening, form a pair of rounded abutments 29 that flank each side of the valve stem. This greatly strengthens the tube at this point and provides a support for the tube when mounted in a tire casing, that relieves the valve of strains in the vicinity of the valve that would otherwise tend to weaken the tube at this point.

After the tube is finally vulcanized, it is taken from the mold and the nut 19 is given its final tightening. If the tube is provided with an angle valve, the valve is twisted on its seat to the position shown in dotted outline in Fig. 7 before the nut 19 is drawn up. This practice permits the tube to be vulcanized with the angle valve extending in the general direction of the tube instead of in the direction that it occupies in service. This also permits the tube with an angle valve mounted in place therein to be vulcanized in the mold with the angle valve mounted therein. This is a material advance over the prior method of vulcanizing the tube with a straight stem valve therein and then removing the straight stem valve and inserting an angle valve after vulcanization.

Figure 9:
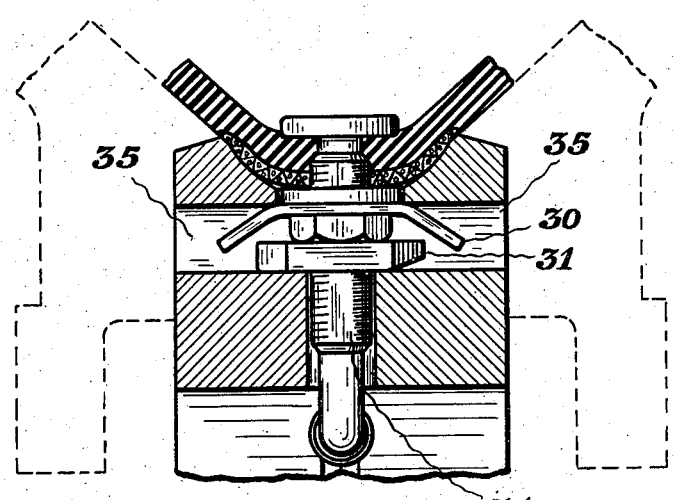
Fig. 9 is a transverse sectional view taken on the line 9—9 of Fig. 8 of the modified form of mold ring shown in Fig. 8.
Figure 10:
Fig. 10 is a side elevational view of an adaptor washer used in the structure shown in Fig. 8 and Fig. 9.
Figure 11:
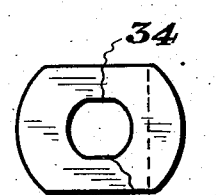
Fig. 11 is a top plan view of the washer shown in Fig. 10.

The mold ring and adapter block shown in Fig. 8 and Fig. 9 differ somewhat from the previously proposed form by providing suitable supporting means for positioning a valve having a spring seat 30 mounted thereon, the valve being of somewhat different angular form and being adapted to be twisted on its seat after the tube is vulcanized. In this structure, a supplemental adaptor washer 31, having a wedge shaped nose portion 32 for more readily directing the washer to its seat in the mold ring and also having an aperture 33 with flattened walls for engaging the flattened side faces 34 of the valve stem, is adapted to be mounted on the valve stem. The washer 31 seats in suitable complemental pockets 35 that are respectively formed in the mold ring and the adaptor block. The entire valve unit is supported from the adaptor washer. The process of vulcanizing this tube is the same as that described for the angle valve tube shown in Fig. 7. The mold ring used in connection with the heater ring shown in Fig. 8 and Fig. 9 may also be formed, if desired, with the grooves 23 and 24 for the accommodation of angle valves of the character shown in Fig. 6 and Fig. 7.

From the above description it will be seen that a tube, such as that shown in Fig. 7, can be vulcanized in a mold of this character with the valve stem extending longitudinally of the tube. After vulcanization, the valve stem can be twisted to the position shown in dotted outline, thus enabling the tube to be vulcanized in a greatly simplified mold of minimum lateral width and without substantial embedding of the base of the valve in the wall of the tube. The provision of a separately formed mold ring 12 also greatly facilitates the machining of the mold shells and thus reduces the expense of their manufacture. Various additional advantages and benefits arising from the practice of my invention will be apparent to those skilled in the art.

Although I have described only a few modifications of the invention, many other modifications will be obvious to those skilled in the art, and I desire therefore to be limited only in accordance with the spirit and scope of the appended claims.

What I claim is:

1. The process of making an inner tube which consists in vulcanizing a rubber tube under internal pressure with an angle valve stem positioned therein with the bent portion of the valve stem extending in the direction of the tube and subsequently twisting the valve stem to a different position in the completely vulcanized tube and securing the same in said position.

2. The process of vulcanizing inner tubes with valve stems in place therein that consists in mounting the valve stem in place within the unvulcanized tube, placing the tube in a heater mold with the valve supported thereby to prevent movement of the valve head, and inflating and vulcanizing the tube while said valve head is held against movement.

3. The process of making an inner tube that consists in building the unvulcanized tube with an angle valve stem mounted in place therein, the bent portion of the valve stem being arranged to extend in the general direction of the body of the tube, tightening the valve in the tube with sufficient pressure to maintain it in place, vulcanizing the tube with the valve in its arranged position and held against movement in the mold during the entire vulcanizing operation, and subsequently twisting the valve on its seat after vulcanization and tightening the valve stem in place in its operating position.

4. The process of vulcanizing an inner tube in a heated mold that consists in mounting a valve within the tube, placing the tube in a mold with the valve so supported as to preclude radial inward movement of the valve stem during vulcanization, inflating the tube, and vulcanizing the tube with the valve so supported throughout the vulcanizing operation.

5. The process of making an inner tube that consists in mounting an angle valve in the unvulcanized tube with the bent portion of the valve stem extending in the general direction of the body of the tube, vulcanizing the tube with the valve in its adjusted position, and twisting the valve on its seat after the tube is vulcanized to a position substantially at right angles to its position during vulcanization.

6. The process of making an inner tube that consists in mounting an angle valve in the unvulcanized tube with the bent portion of the valve stem extending in the general direction of the body of the tube, immovably supporting the valve from the mold during the entire vulcanizing period, vulcanizing the tube with the valve in its adjusted position, and twisting the valve on its seat after the tube is vulcanized to a position substantially at right angles to its position during vulcanization.

7. A mold for vulcanizing inner tubes for pneumatic tires that comprises a pair of registered mold members that together define an annular molding cavity, a removable ring forming the radially inner surface of the molding cavity, said ring being rigidly carried by one of the mold members and being recessed at the valve receiving portion thereof for receiving a straight or an angle valve, and a valve adaptor block carried by the other portion of the mold that registers with the recessed portion of the mold ring, said mold ring and adaptor block having a pair of intersecting grooves that together provide an aperture for receiving either straight or angular valve stems.

8. A mold for vulcanizing inner tubes for pneumatic tires that comprises a pair of opposed mold shells, a valve adaptor block carried by one of said shells, a mold ring carried by the other of said shells and having a portion adapted to receive the adaptor block, a pair of opposed radial grooves respectively formed in the mold ring and the adaptor block for receiving a straight stem tube valve, a second pair of opposed grooves respectively formed in the mold ring and the adaptor block and each communicating with the aforesaid radial grooves to receive an angle tube valve.

9. A mold for vulcanizing an inner tube comprising a pair of opposed mold shells having spaced inner flanges, a separately formed endless ring carried by one of said mold shells for completing the molding cavity, and having a recess in one edge portion, and an adaptor block carried by the other mold member and adapted to be received in the recess of the mold ring, said adaptor block and the opposed face of the mold ring being respectively provided with a radial groove and a longitudinally extending groove that intersects therewith that together provide recesses for receiving either straight stem or angle valves carried by tubes to be vulcanized in said mold.

10. A mold for vulcanizing inner tubes comprising separable side sections having complemental recesses forming an annular mold cavity to receive an inner tube, an inner ring fitting between the side sections to close the interior of the annular cavity, said ring having an aperture to receive the valve stem of an inner tube in the mold and a circumferentially extending recess to receive a laterally bent end of a valve stem.

11. A mold for vulcanizing inner tubes comprising separable side sections having complemental recesses forming an annular mold cavity to receive an inner tube, an inner ring fitting between the side sections to close the interior of the annular cavity, said ring having a circumferentially elongated recess extending inwardly from one side thereof and an adaptor block fitting in said recess, the body of said ring and said block having their abutting faces recessed to receive an angle valve stem between them.

In testimony whereof I affix my signature.

ISIDORE J. REMARK.